Dec. 27, 1960 W. J. KALLIO 2,966,081
DRILL
Filed March 18, 1959 2 Sheets-Sheet 1
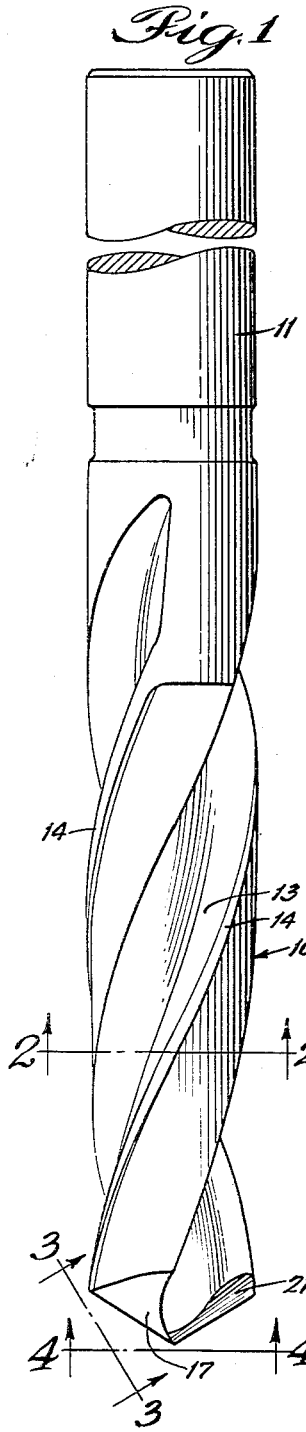
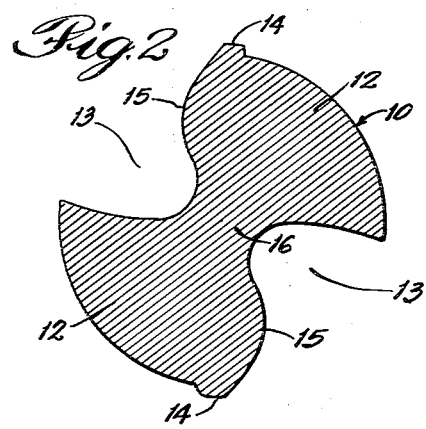
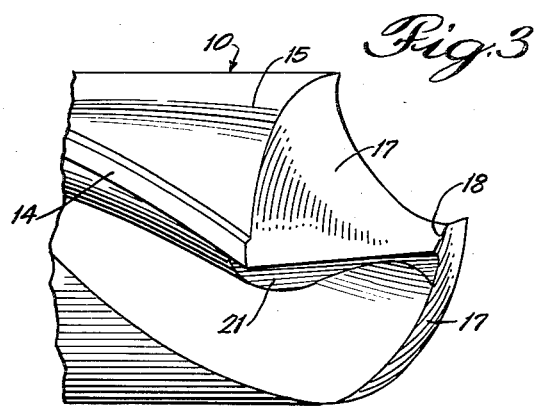
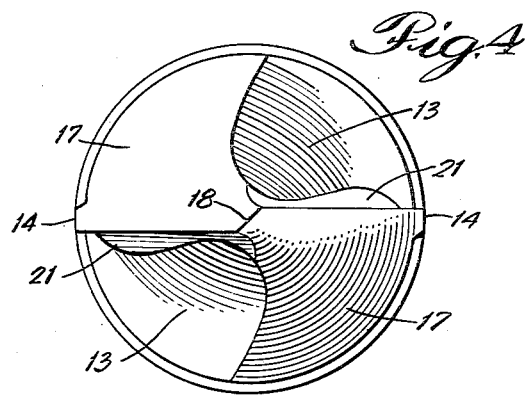
INVENTOR:
William J. Kallio,
BY Pair Freeman & Molinare
ATTORNEYS.

Dec. 27, 1960 W. J. KALLIO 2,966,081
DRILL
Filed March 18, 1959 2 Sheets-Sheet 2

INVENTOR:
William J. Kallio,
BY Blair, Freeman & Molinare
ATTORNEYS.

United States Patent Office 2,966,081
Patented Dec. 27, 1960

2,966,081

DRILL

William J. Kallio, Glen Ellyn, Ill., assignor to United-Greenfield Corporation, Chicago, Ill., a corporation of Delaware Filed Mar. 18, 1959, Ser. No. 800,199

5 Claims. (Cl. 77—70)

This invention relates to drills and more particularly to twist drills for drilling relatively ductile materials.

In drilling relatively ductile materials such as low carbon steel, and in drilling many of the stainless type steels and other alloys the chips tend to remain in relatively long lengths that become wrapped around the drill and the drilling spindle, or come out as spring-like ribbons. These long coils and ribbon-like chips are dangerous to the operator of the drilling machine and prevent the proper application of cutting fluid to the drill point. Frequent stoppage of the drilling equipment to remove these hazardous coils and ribbons becomes necessary making the drilling of relatively deep holes a very costly procedure. Various expedients have been attempted to remedy this condition and to break up the chips, including grinding the cutting face of the drill with a flat to reduce the rake thereof, grinding grooves across the cutting edge of the drill to break up the chips, or grinding a small groove along and parallel to the cutting edge of the drill to curl and break the chips.

None of these expedients is very satisfactory. It is not possible to form an adequate chip curler along the face of and parallel to the cutting lips without destroying a major portion of the margins near the outer corners of the point. The weakened margins wear down very rapidly in use resulting in a relatively short tool life. The entire cross section of the drill at the point is also weakened by the formation of this chip curler.

Drills in which a flat is ground along the face of and parallel to the cutting lips to reduce the rake angle are not satisfactory because the margins near the outer corners of the point are practically destroyed. In addition to ruining the margins and weakening the drill point the reduced rake angle creates a demand for greater torque. The increased torque requirement in turn places a greater strain upon the drill, the spindle and the entire driving mechanism of the drilling machine. The horse power requirement also increases so greatly that this method must often be discarded with large drills due to an inadequacy of the usual motor drive.

It is accordingly an object of the present invention to provide a drill in which the chips will be broken into small pieces without complicating sharpening of the drill or weakening the drill body.

Another object is to provide a drill in which the leading faces of the drill lands are convex in section and the cutting edges trail the convex faces and are joined thereto by short open grooves which define chip curling or breaking surfaces spaced axially from the leading cutting edges.

According to a feature of the invention, the drill has a fluid body which is of conventional twist drill or core drill construction except that the leading faces of the lands are formed to be convex in section and an open groove is formed across each of such faces at the cutting tip of the drill to define the cutting edges and chip curling or breaking surfaces without reducing the margins.

Preferably the grooves extend across the web of the drill body in a twist drill construction to thin the web. A drill of such construction is easy to resharpen and is actually stronger than a conventional twist drill.

The above and other objects and features of the invention will be more readily apparent from the following description when read in connection with the accompanying drawing, in which:

Figure 1 is a side elevation of a drill embodying the invention;

Figure 2 is a transverse section on the line 2—2 of Figure 1;

Figure 3 is a partial enlarged view of the drill tip on the line 3—3 of Figure 1;

Figure 4 is an end view of the drill tip on the line 4—4 of Figure 1;

Figure 5:
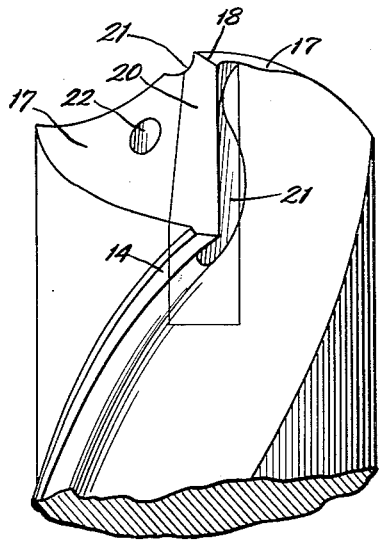
Figure 5 is a view similar to Figure 3 looking straight along one of the cutting edges and grooves and illustrating modifications.

The drill, as shown in Figures 1 to 4, comprises an elongated body, indicated generally at 10, provided at one end with a shank 11 for mounting it and terminating at its opposite end in a cutting tip. The drill body, as shown, is of a two-flute construction defined by a pair of lands 12 spaced diametrically and separated by chip flutes 13. The lands and chip flutes extend spirally along the body, as shown in Figure 1, although if desired the lands and chip flutes could extend axially without twisting.

Each of the lands is provided at its leading edge with a margin 14 to engage the sides of the bore and is relieved behind the margin, as is conventional. The leading face of each land, as best seen in Figure 2, is convexly curved, as indicated at 15, between the leading edge of the margin 14 and the web portion 16 of the drill body. This configuration of the land faces can easily be achieved either during grinding of the flutes or in the formation of the drill flutes in other manners.

At the cutting tip the drill may be sharpened in a conventional way with angularly related end portions 17 extending from the periphery of the drill lands to the web and meeting at the web in a chisel edge 18. This sharpening may be accomplished in a conventional manner with the surfaces 17 receding axially from the leading edges of the lands to provide the usual relief.

The cutting edges of the drill and a chip breaking surface therefor are formed by milling or grinding open grooves 21 from the points of intersection of the margin 14 with the leading faces of the lands straight to the chisel edge 18, as shown. The grooves at one side are ground parallel to the margins so that the cutting edges of the drill will have the usual rake and are curved, for example, by grinding on a round edged wheel to leave a shoulder portion axially spaced from the cutting edge against which the chips will curl. The groove is relatively shallow axially, as indicated in Figure 3, so that chips turned up by the cutting edge during a drilling operation will be sharply curled by the surface of the groove 21 and will be broken into short lengths so that they can pass easily through the flutes without clogging. Preferably the grooves are ground at a slight angle to the cutting edge and across the chisel edge of the drill, as indicated best in Figures 3 and 4, so that they will narrow the web at the tip of the drill to leave a relatively short chisel edge 18. The grooves extend from the leading edges of the margins 14 across the web of the drill and are cut into the convex leading faces of the lands only as shown.

With this construction, the chips, even of ductile material, will be sharply curled against the groove surface and will normally be broken into short lengths. It will be observed that the drill can be resharpened very easily by first grinding the faces 17 in the usual manner and then by passing the edge or corner of a wheel along the cutting edges to reform the grooves 21 and to the chisel edge length of the drill. When so sharpened the drill will be actually stronger than a conventional twist drill due to the greater strength imparted to the lands by the convex forward surfaces thereof and due to the fact that the web can be made relatively thick without impairing its capability of penetration during a drilling operation.

The drill, as shown, may be provided with a solid body and shank or may, if preferred, be formed with oil passages, as indicated at 22 in Figure 5, extending through the lands of the body and opening into the cutting tip thereof. During a drilling operation a suitable lubricant or coolant may be forced through the passage 22 to cool the drill and to carry out chips.

As also shown in Figure 5, the drill tip may carry a hard carbide insert at the cutting edges and chip curling surfaces. As shown an insert 20 may be secured in a diametrically extending groove in the drill body and the cutting edges and at least a part of the groove 21 may be formed in the insert. The sides of the insert and the groove in which it is secured are preferably parallel to the drill axis and the insert may be made of any desired size, but is preferably in approximately the proportions shown.

Figure 6:
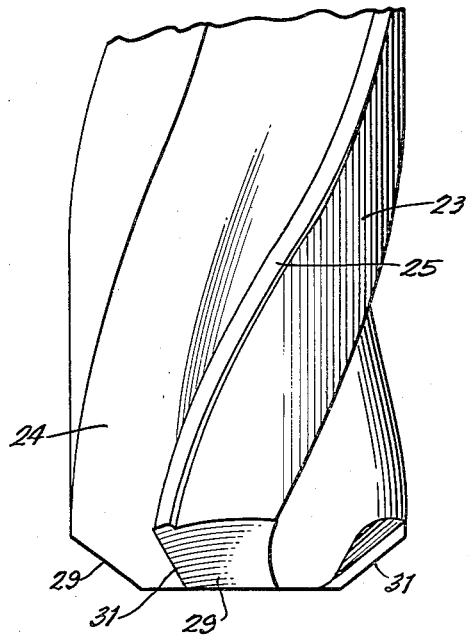
Figure 6 is a side elevation of a core drill embodying the invention.
Figure 8:
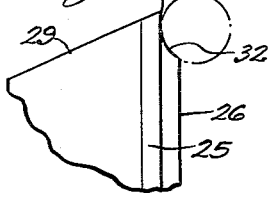
Figure 8 is a partial elevation looking toward the margin of the core drill.
Figure 7:
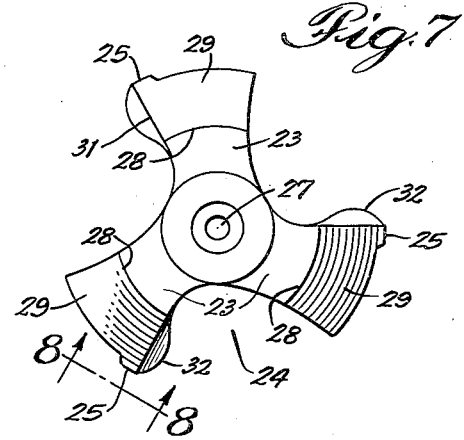
Figure 7 is an end view of the core drill.

Figures 6 to 8 illustrate an application of the present invention to a core drill for drilling and enlarging preformed openings in castings, or the like. The construction, as shown, comprises an elongated body formed with a plurality of lands 43 separated by chip flutes 24. In the construction shown, there are three lands and three chip flutes, although this number could be varied as desired. Each of the lands is formed near its leading edge with a margin 25 and has its leading face convexly bowed outwardly, as indicated at 26, between the margin and the radially inner portion of the land where it blends into the center part of the drill body. The drill body may be solid in its center portion to connect the several lands and may terminate in a flat outer end formed with a center 27 by which the drill body is supported during forming and grinding. It will be noted that in this type of drill, all of the cutting is performed outwardly of the lands 28 in the portion defined by the surfaces 29 which extend conically with respect to the drill axis and which are formed with a suitable relief angle.

The cutting edges of the drill, as shown at 31, extend in a straight line from the leading edge of each margin 25 radially inward and are defined by open grooves 32 formed in the convex portions 26 on the faces of the lands in the same general manner as in the drills of Figures 1 to 5. The core drill of Figures 6 to 8 will function in the same manner as the drill of Figures 1 to 5 with chips turned up by the cutting edges being sharply curled in the open grooves 32 to be broken into relatively short lengths so that they can be removed easily through the chip flutes. It will be noted in this construction, as is Figures 1 to 5, the rake angle is not interferred with, the margins are not weakened or destroyed, and the drill body will have at least as much strength as a similar drill of conventional construction.

While three embodiments of the invention have been shown and described in detail it will be understood that these are illustrative only and are not to be taken as a definition of the scope of the invention, reference being had for this purpose to the appended claims.

What is claimed is:

1. A drill comprising a drill body having at least one chip flute defined by angularly spaced land faces, the land face at the trailing side of the chip flute being convex in cross section, and a cutting edge formed on the land face at the trailing side of the flute and trailing the land face and joined to the land face by a short open groove defining a chip curling surface spaced axially from and leading the cutting edge said open groove being entirely in the convex portion of said land face and extending from the leading edge of the margin to the center of the drill without interrupting the margin.

2. A drill comprising a drill body having at least one chip flute defined by angularly spaced land faces, the land face at the trailing side of the flute being convex in cross section radially within the periphery of the drill body and substantially to the center part of the drill body, and a straight cutting edge extending substantially radially from said land face at the leading edge of the margin of the drill body and trailing the land face through the major portion of its radial length and joined to the land face by a short open groove defining a chip curling surface spaced axially from and leading the cutting edge said open groove being entirely in the convex portion of said land face and extending from the leading edge of the margin to the center of the drill without interrupting the margin and with one surface thereof parallel to the leading edge of the margin.

3. A drill comprising a drill body having flutes providing lands connected by a relatively thin web, the leading face of each land being convex in cross section between the margin of the drill and the web, and a cutting edge at the leading face of each land trailing the convex face thereof and joined to the convex face by a short open groove defining a chip curling surface spaced axially from and leading the cutting edge said open groove being entirely in the convex portion of said land face and extending from the leading edge of the margin to the center of the drill without interrupting the margin.

4. The drill of claim 3 in which each cutting edge extends straight from the leading face of the land at the margin of the drill and the groove crosses the web to thin it at the drill tip.

5. A drill comprising a drill body having a plurality of flutes providing a plurality of lands connected by a central body portion, the leading face of each land being convex in cross section between the margin of the drill and the central body portion, and a straight cutting edge at the leading face of each land defined by a short open groove in the convex portion only thereof extending across the convex face of the land from the leading edge of the margin to the center of the drill without interrupting the margin and which forms a chip curling surface.

References Cited in the file of this patent

UNITED STATES PATENTS

| 262,588 | Hartshorn | Aug. 15, 1882 |
| 1,309,706 | Taylor | July 15, 1919 |

FOREIGN PATENTS

| 570,667 | Germany | Feb. 18, 1933 |